United States Patent [19]

Oettel

[11] Patent Number: 4,662,156

[45] Date of Patent: May 5, 1987

[54] PROTECTIVE MASK FOR ANIMALS

[76] Inventor: Carmen G. Oettel, 12717 S. 130th St., Chandler, Ariz. 85224

[21] Appl. No.: 813,429

[22] Filed: Dec. 26, 1985

[51] Int. Cl.⁴ .............................................. B68C 5/00
[52] U.S. Cl. ....................................................... 54/80
[58] Field of Search ...................... 54/80, 81; 2/4, 15, 2/434

[56] References Cited

U.S. PATENT DOCUMENTS

| | | | |
|---|---|---|---|
| 382,668 | 5/1888 | Sullivan | 54/80 X |
| 449,485 | 3/1891 | Long | 54/80 X |
| 2,407,029 | 9/1946 | Miller | 54/80 |
| 4,355,600 | 10/1982 | Zielinski | 54/79 X |
| 4,581,877 | 4/1986 | Wilbur | 54/80 |

Primary Examiner—Robert P. Swiatek
Attorney, Agent, or Firm—H. Gordon Shields

[57] ABSTRACT

Protective mask for animals includes a continuous one-piece screen for covering the eyes and adjacent facial areas on an animal and includes a single cutout area for the animal's ears. Both the cutout area and the portion of the mask that fits around the animal's muzzle or lower face are trimmed in a plush material.

15 Claims, 4 Drawing Figures

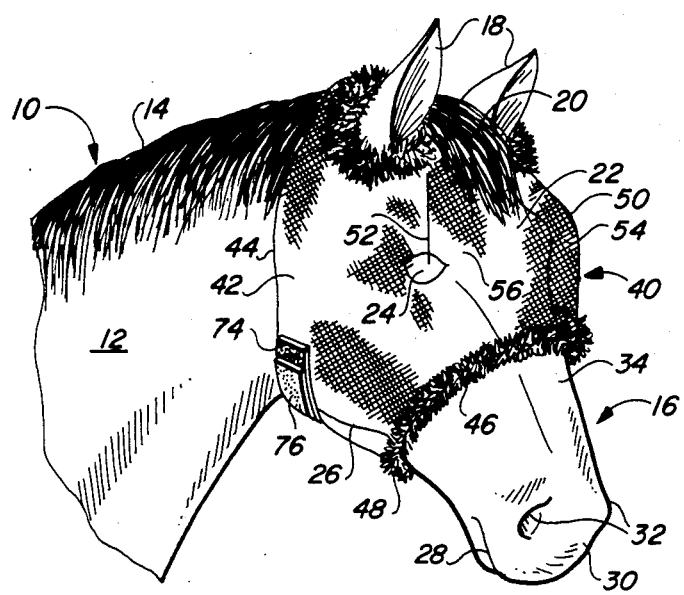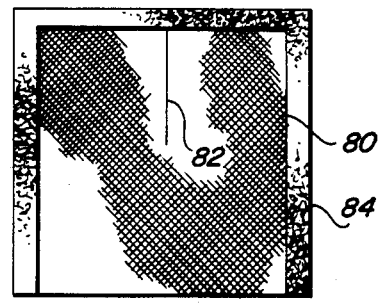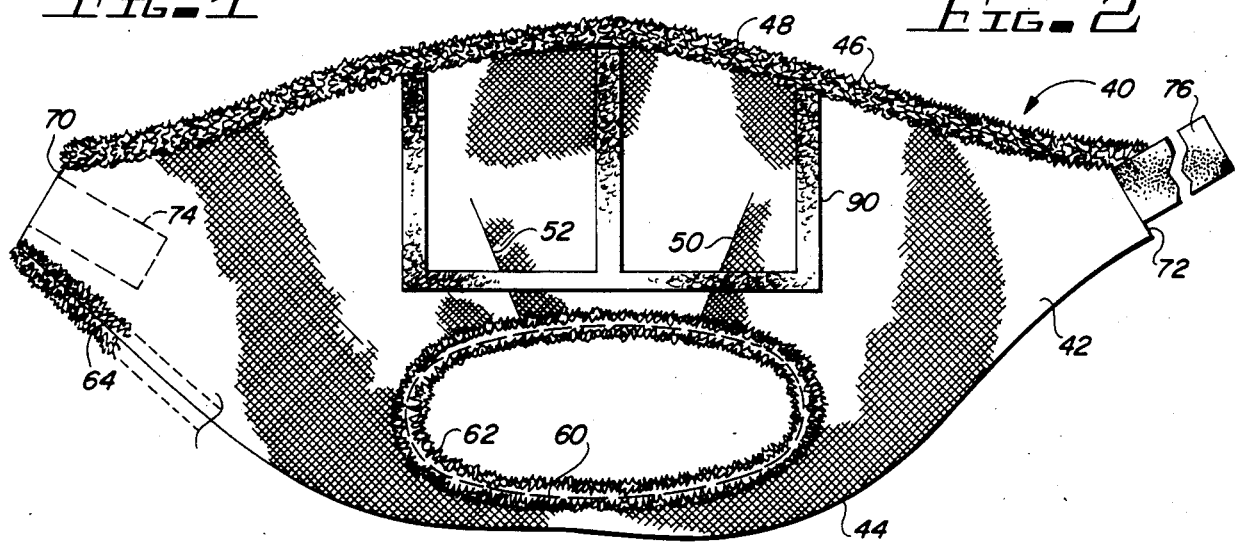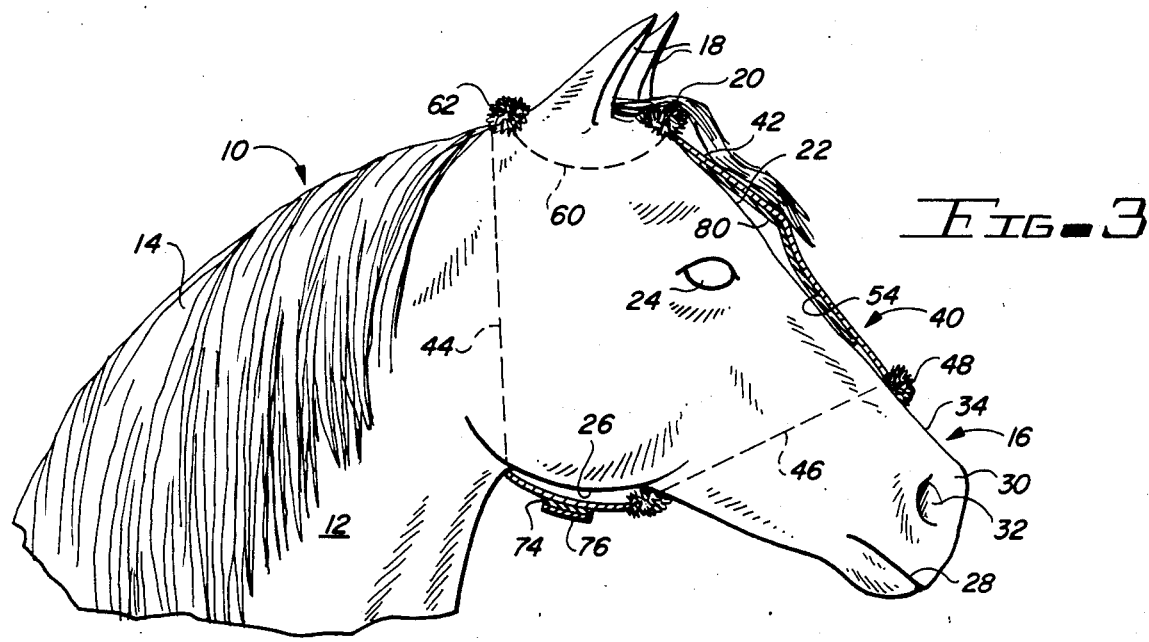

PROTECTIVE MASK FOR ANIMALS

BACKGROUND OF THE INVENTION

1. Field of the Invention

This invention relates to protective gear for anmimals and, more particularly, to a protective mask for animals to protect the animal's eyes from flies.

2. Description of the Prior Art

Over the years, flies have been a constant irritation to certain farm animals, primarily horses and cows. In order to protect an animal's eyes from the flies, different types of protective masks or articles have been designed. For example, U.S. Pat. No. 287,885 discloses individual screen coverings for a horse's eyes, with straps that secure the protective eye coverings to a bridle.

U.S. Pat. No. 481,152 discloses another type of eye protector for horses. The eye protector includes individual eye coverings with straps to secure the eye covering to a bridle. In addition, a fringe element is securable to the eye protector and extends downwardly over the horse's face, covering the nostrils to protect the nostrils from flies and other insects.

U.S. Pat. No. 903,108 discloses another type of eye covering which, like the two patents previously discussed, includes individual eye coverings. A system of straps are used to secure the eye coverings in place on the horse's head and neck. A primary difference between the apparatus of the '108 patent and of the '885 and '152 patents is that the '108 patent is independently securable to a horse, and need not be affixed to a bridle or halter.

U.S. Pat. No. 2,407,029 discloses a protective mask for a horse in which the mask covers the entire upper face of the horse and it includes two openings for the horse's ears. The apparatus fastens beneath the horse' head and is independent of any bridle or halter. The apparatus of the '029 patent includes separate eye protectors which extend outwardly from the mask.

U.S. Pat. No. 3,104,508 discloses a fly mask designed primarily for cows. The apparatus is designed to fit around the nose of a cow and also to buckle beneath the cow's neck. The mask also includes two holes or apertures which receive the cow's ears. The apparatus also includes a continuous screen portion across the front which protects the cow's eyes but allows the cow to look outwardly. The apparatus is relatively stiff and thus retains its shape while on a cow.

U.S. Pat. No. 3,753,334 discloses a protective bonnet designed primarily for a horse. The entire upper portion of a horse's face and upper head are enclosed in the bonnet. The bonnet is preferably made of a screen material and is secured to the horse's head by means of elastic straps. In addition, side bands extend between the elastic bands along the side of the animal's face. Other embodiments are shown which either cover the ears separately or the horse's ears may be excluded from the bonnet.

U.S. Pat. No. 3,964,241 discloses another type of protective mask for large animals such as horses, in which a pair of relatively bulbous screen elements are disposed over the animal's eyes and portion of the head below the ears and slightly below the eyes. In addition to the bulging mesh portions, straps are disposed behind the animal's ears and ties are secured beneath the animal's head.

U.S. Pat. No. 4,040,239 discloses another type of protective head gear in which a mask extends substantially continuously about a horse's head from slightly above the nostrils to rearwardly of the ears. The apparatus includes straps which secure the apparatus to the horse's head. Cutout apertures extend through the head gear for the horse's ears. Protective cups extend on the sides of the horse's eyes to protect the eyes. The apparatus of the '239 patent is designed not to protect the horse's eyes from flies, but simply to provide general protection to the horse's head. Accordingly, there is no provision for a screen for the horse's eyes. However, it is believed that, if desired, screen could also be used to protect the horse's eyes from flies. However, such is not the primary purpose of the '239 apparatus.

U.S. Pat. No. 4,404,789 discloses another type of screen protection for a horse which includes a bubble-type screen extending across the front of a horse's face above, below, and to the sides of the horse's eyes. The screen material is secured to straps which extend around a horse's nose or face beneath the eyes and straps which extend along the side of the horse's face and up the horse's head behind the ears. The straps are secured by "Velcro" type fasteners.

U.S. Pat. No. 4,480,429 discloses another type of eye protection for a horse which includes a mask that fits substantially over the horse's face beneath the ears, with a strap extending behind the ears to help hold the mask on. The mask includes screen caps covering the eyes.

It will be noted that substantially all of the patents discussed above include some strap arrangement for securing the mask or protective articles to a horse's head. In addition, several of them include cutout portions with either screen or some other material fastened to the body of the mask at the cutout portions. Obviously, when such portions are included, there are seams involved. The seams comprise potential frictional elements for irritating the horse's skin.

In order to protect a horse's eyes from flies, it is necessary to have the lower portion of the mask or protective gear tightened a substantial degree about the horse's face or nose. Otherwise, flies may simply crawl up the horse's face beneath the mask to get to the eyes. As is well known and understood, flies and other insects are attracted by tears. Tears flow or run down an animal's face from tearing eyes, and insects climb or walk up an animal's face on the tear path to the animal's eyes.

In the first several patents discussed above, in which individual eye protectors alone are used, the eyes are protected to some degree. However, the utilization of separate eye protectors, as in the first several patents discussed above, requires that the separate protective elements be fastened relatively securely against the horse's face. Otherwise, the same result is obtained, namely the ability of a fly or insect to simply walk up the face beneath the mask to get to the eyes of an animal.

Some of the masks discussed above include several seams, which, as indicated, provide potential frictional problems. In addition, it is well known that horses like to rub. Accordingly, the material out of which a mask or protective gear is made must be able to withstand the rubbing that a horse customarily does. If there are seams in the area where a horse will rub, the seams create problems with the horse's face. If the material out of which the protective gear is made is not of a substantial strength, particularly abrasion-resistant material, then the protective gear may be ruined rather rapidly. Finally, it will be noted that flies are much more prevalent in summer when the temperatures for animals may be as unpleasant for animals as for people. If an animal's ears (and a horse's ears and forelock) are not free form a mask, extra discomfort is caused by having the ears (and the forelock) beneath the mask.

Where seams rub on an animal's skin or hair, abraded areas result. Infected flies deposit stomach worm larvae in the abraded areas or in any untreated cut, and the larvae then live in the abraded or cut areas and casue what are referred to as summer sores. The stomach worm larvae may also be deposited in the corners of the eyes by the flies, causing at least itching and irritation.

Where straps are tight about an animal's face to prevent insects from crawling beneath the mask, as with the prior art, hairs typically abrade off or turn white, and may cause scar tissue formation. This is particularly true around a horse's nose. None of these results is desirable, and all are to be avoided. The apparatus of the present invention avoids them.

The apparatus of the prevent invention overcomes the problems of the prior art by providing a one-piece protective head gear for protecting an animal's eyes from flies and by providing trim material that will allow the protective gear or article to be secured in a relatively loose manner so as to not cause discomfort to the animal and yet to retain the fly-resistant qualities intended. The material out of which the protective article is made is relatively abrasion-resistant, also.

The apparatus of the present invention provides comfort for an animal, is relatively durable, and substantially elminates sources of irritation to the animal's eyes, such as insects, sun, dust, etc.

SUMMARY OF THE INVENTION

The invention described and claimed herein comprises a mesh element which includes plush material where the apparatus fits around the animal's face and ears. Fastening straps are adjustable so that one size mask will fit animals having a range of head sizes. For horses, the ears and forelock are disposed outside of the mask for maximum comfort.

Among the objects of the present invention are the following:

To provide new and useful protective head gear for animals;

To provide new and useful apparatus for protecting an animal's eyes from flies;

To provide new and useful fly mask apparatus for horses;

To provide new and useful fly mask for protecting an animal's eyes from flies;

To provide a new and useful one-piece protective article for relatively large animals; and To provide a new and useful fly guard for a horse which may be relatively loosely secured to a horse's face.

BRIEF DESCRIPTION OF THE DRAWING

FIG. 1 is a perspective view of the apparatus of the present invention in its use environment.

FIG. 2 is a plan view of the apparatus of the present invention.

FIG. 3 is a side view in partial section of the apparatus of the present invention in its use environment.

FIG. 4 is a plan view of a portion of the apparatus of the present invention.

DESCRIPTION OF THE PREFERRED EMBODIMENT

FIG. 1 is a perspective view of a portion of a horse 10, including a neck 12 and a head 16, with protective mask apparatus 40 of the present apparatus disposed on the head 16. The mask apparatus 40 is opened outwardly in FIG. 2, providing a plan view of the mask apparatus 40. In FIG. 3, the mask apparatus 40 is shown in partial section over the head 16 of the horse 10 illustrating various safety aspects of the mask 40. For the following discussion, reference will be made to FIGS. 1, 2, and 3.

A portion of the horse 10 is shown in both FIGS. 1 and 3, including the neck 12 and the head 16, both of which are pertinent to the mask apparatus 40 of the present invention. For illustrative purposes, the neck 12 is shown with a mane 14, and the head 16 is shown with several specific features which are of interest with respect to the apparatus of the present invention. For the horse's head 16, a pair of ears 18 are shown extending upwardly from the top of the head. Extending downwardly between the ears is a forelock 20. The forelock 20 is shown outside of the mask apparatus 40, but above a forehead 22 of the horse. If the mask 40 were not in place, then the forelock 20 would be disposed on the forehead 22.

The horse 10 includes a pair of eyes 24, only one of which is shown in FIGS. 1 and 3. The horse's head 16 also includes a jaw 26. Downwardly from the jaw 26 is a mouth 28. Above the mouth 28 is a muzzle 30, and a pair of nostrils 32 are shown in FIG. 1, and only a single nostril 32 is shown in FIG. 3.

Between the forehead 22 and the muzzle 30 is an upper muzzle or lower face portion 34. The significance of the various parts of the horse's head will be realized in the detailed description of the mask apparatus 40 below.

The mask apparatus 40 is preferably made of an elastomeric mesh material 42. While elastomeric mesh is preferred, other materials may also be used. However, certain materials, such as fiberglass cords, should preferably be avoided. For example, if the mask 40 were made of fibrous material, and a break were to occur in the mask, then the fibrous material could cause problems with the horse or other animal on which the mask is disposed. This is particularly true if a tear or rip were to occur in the vicinity of the animal's eye. While a tear in any kind of mask adjacent to the eye may be of concern, if the mask were made of a fiberglass or similar fibrous material, a tear in the area of the eyes could be doubly critical because of the possibility or likelihood of injury to the eye caused by such fibrous material dropping into the eye. With elastomeric material, such likelihood is substantially eliminated since there are no discrete fibers to separate from the mask and thus to fall into the animal's eye.

The elastomeric material is preferably polyester cord covered with vinyl. Ultraviolet inhibited vinyl is a suitable covering for the polyester cord. Such UV inhibited vinyl comes in a wide range of colors for aesthetic purposes or attractiveness.

Typically, polyester core yarn is coated with the vinyl and the coated yarn is then woven into a mesh. After weaving, the resulting fabric is treated with heat and pressure to provide a unitary mesh.

The mesh size may vary in extent of open/closed area from about 40%/60% to about 20%/80% The greater the closed area of the mesh, the less the solar penetration. The less solar penetration, the less chance for eye cancer caused by the sun's rays. This is particularly applicable to animals without pigmented skin around their eyes. Also, obviously, the greater the shade for the animal's face, the less dust, etc. penetrates the mesh to irritate the animal's eyes.

The mask apparatus 40, as best shown in FIG. 2, includes a curved upper edge 44. The curved upper edge 44 is designed to go around the horse's head, behind the ears 18, and rearwardly of the jaw 26, at about the juncture of the neck 12 and the head 16.

The mask apparatus 40 also includes a lower curved edge 46 which, as shown in FIGS. 1 and 3, is designed to go around the horse's head between the eye 24 and the mouth 28, slightly above the nostrils 32 and slightly above the muzzle 30, in the area of the upper muzzle or lower face 34. The lower curved edge 46 includes a plush lining material 48 along the entire length of the edge 46. The plush material 48 prevents insects, such as flies, from crawling upwardly beneath the edge 46, and along the horse's head to an eye 24.

As is well known and understood, certain insects, namely flies, have an affintity for the eyes of animals. The potential damage to a horse from flies or other insects burrowing into the skin adjacent to the eye is well known and understood, as discussed above. By laying eggs in the area, substantial harm may come to the eyes of the horse. Flies also bite and cause bloody and/or infected sores in the eye lids, causing great discomfort, and may threaten the loss of eyes or eyesight through infection. The utilization of plush material 48 prevents such an occurrence.

The plush material 48 allows the curved edge 46 to be relatively loose and yet to prevent the flies or other insects from getting beneath the mask. As is well known and understood, the particular configurations of each animal head are different. If the plush material were not present, then the bottom edge 46 would have to be relatively tight to prevent insects from crawling beneath the mask. Such tightness, obviously, is uncomfortable to an animal. A tight mask may, in fact, do substantial damage to the horse's skin in certain areas where the contact is the greatest, as also discussed above. And due to the configuration of the particular animnal's head, the mask may be loose in some areas so that insects may in fact crawl beneath the mask. Such possibility is substantially eliminated by the use of the plush material at the lower edge 46.

The upper and lower edges 44 and 46, respectively, extend towards each other and terminate at edges 70 and 72. Extending outwardly from the edges 70 and 72 are fastening straps 74 and 76, respectively. The fastening straps 74 and 76 are preferably secured to outwardly extending tabs of the mesh material 42 out of which the mask apparatus 40 is made. The fastening straps 74 and 76 may be any appropriate material, and are preferably a "Velcro" type fastening material for convenience and ease of installation and removal. Moreover, if "Velcro" type material is used, then the possibility of an accident to a horse, as when a foal with a mask inadvertently gets the mask caught on a post, etc., is minimized. As is well known and understood, foals with halters have strangled when the halters have become caught, and when such halters did not have a "break-away" feature. Such accidents could occur with a mask if a mask did not have such a "break-away" feature. The "Velcro" type fasteners 74 and 76 provide such a "break-away" feature to prevent inadvertent accidents.

An oval opening 60 is spaced apart downwardly a relatively short distance from the upper edge 44 of the mask apparatus 60. The opening 40 comprises an opening for the ears 18 and the forelock 20 of the horse 10, as shown in FIGS. 1 and 3.

The opening 60 is lined with plush material 62, which is substantially the same as the plush material 48 disposed on the edge 46 and about the upper muzzle or lower face 34 of the horse 10. The plush 62 provides substantially the same function as the plush 48. The plush 62 prevents insects from crawling inside the mask 40 to the eyes 24 of the horse 10 and also prevents rubbing or scraping of the horse's ears or adjacent hair and skin which may otherwise occur at and/or by the edge 60. The plush provides a comfort to the animal (horse 10) by preventing rubbing and chafing by the edge 60.

As best shown in FIG. 3, the opening 60 allows the forelock 20 to be moved off the forehead 22 of the horse 10, and the forelock 20 is thus disposed on the outer or top surface of the mask 40. This really provides two functions. In the first place, the forelock is not trapped beneath the mask to increase the discomfort of a horse in terms of heat, sweat, etc. In the second place, the mask keeps the forelock 20 actually elevated above the horse and thus aids in cooling the horse. In addition, with the forelock on top of the mask, the mask does not add additional pressure against the forelock and, to or through the forelock 20 against the horse's forehead 22. The additional pressure is thus not present on the horse's forehead 22 which would cause discomfort and additional heat problems with the horse.

Extending downwardly from the lower edge of an opening 60 is a pair of darts 50 and 52 which provide eye pockets 54 and 56 in the mask 40 adjacent to the eyes 24 of the horse. That is, the darts 50 and 52 provide convexly curved outer configurations in the mask 40 to provide extra room adjacent to the eyes of the horse so that the mask is not contacting the horse's head 16 in the area of the eyes. This allows the horse to blink its eyes without interference between the horse's eyelashes and the mask.

It will be noted that the mask apparatus 40 is made of a single panel of mesh 42. With a single mesh panel, seams are avoided. An advantage in avoiding seams is that there is less rubbing and chafing of the mask apparatus against the animal as the animal moves with the mask 40 on the animal's head. In addition, it is obvious that the plush material 48 and 62 substantially decreases the chafing and rubbing of the mask 40 on the animal's head.

It will be noted that a protective mask, such as the mask 40, is designed to be worn substantially continuously by an animal. Thus, the matter of rubbing and chafing becomes significant. Or, in the present situation, what is significant is the lack of rubbing and chafing with the mask 40. As is well known and understood, continuous rubbing in a local area on an animal results in hair loss and skin problems. Without seams, and made of a single mesh panel 42, and with plush material 48 and 62 being placed at areas of maximum contact with the animal's head, the mask apparatus 40 eliminates potential problems and provides a functional and comfortable mask for the animal.

It will be noted that the jaw 26 of the animal 80, at the juncture of the neck 12 and the head 16, is relatively straight and flat. Plush material may or may not be required for comfort because rubbing and chafing may or may not be problems. However, if desired, and as shown in FIG. 2 by reference numeral 64, plush material may also be added to the upper edge 44. The inward crawling of insects past the edge 44 is generally not a problem, just as the downward crawling of insects past the aperture 60 is generally not a problem. The plush 62 is primarily for comfort, and the plush 64 is likewise primarily for comfort. However, the plush 64 may also serve a functional purpose combined with the comfort, and that purpose is to insure that the mask is not fastened too tight. With the plush 64 disposed about the animal's neck, the tendency to tighten the straps 74 and 76 to insure that the edge 44 is "tight" about the neck 12 and jaw 26 is alleviated. Rather, with the plush 64 on the edge 44, the natural tendency is merely to "snug" the mask 40 in place, rather than "tighten" the mask in place.

An eye cup 80 is shown in FIG. 3 as disposed in the eye pocket 54 of the mask apparatus 40. FIG. 4 is a plan view of the eye pad or cup 80. The eye pad 80 is made of opaque material and is disposed over the eye pocket 54 (see FIG. 3) for protecting a dilated pupil or a treated eye of the animal 10. The pad or cup 80 may be appropriately fastened to the mask apparatus 40 by various means, such as "Velcro" type fastening elements 84 and 90, which will be discussed below.

The purpose of the eye cup 80 is, of course, to keep light away from a treated eye while the eye is healing. As is well known and understood, if an eye has been treated, whether dilated or not, is is preferable to have the eye remain in darkness for comfort of the animal and for the benefit to the healing process. Obviously, if an eye has been dilated, then it is imperative that light be kept from the eye until the pupil recovers from its dilation and returns to its normal contracted condition. The utilization of the mask apparatus 40 protects the eye from insects during the healing process, and the cup 80 prevents unwanted light from impinging on an eye 24. At the same time, the mask apparatus 40 with the cup 80 secured thereto allows the recovering animal to be in a normal environment, as opposed to being confined in an unlighted stall, etc. Air may circulate through the mesh 42 for the comfort of the animal 10, but dust and insects and even light are limited in their access to the animal within the mask apparatus 40, and light is prevented from impinging on the particular eye beneath the cup 80.

Attaching the cup to the mask has the added advantage of providing a positive means to keep the protective eye cup in place. Attempting to bandage an eye and keep the bandage in place on the eye of an animal that rubs can be quite difficult and is usually unsuccessful. The mask 40 provides a solution to the problem of keeping an eye cup in place while the animal heals.

In FIG. 4, the eye cup or patch 80 is shown as having a generally rectangular configuration, with a dart 82 extending toward the center from one edge, the bottom edge, of the cup or patch. On three edges of the cup or patch 80, namely the two side edges and the top edge, are "Velcro"type fastening elements 84, which are preferably of the hook type. The bottom edge of the cup or patch is free from fastening elements. The fastening elements 84 cooperate with mating fastening elements 90 on the inside of the mask 40. See FIG. 2. The fastening elements 90 are in the configuration of a block "M", with three vertical legs extending upwardly from the bottom edge 46 of the mask 40, and with a horizontally extending top portion joining the three vertical edges. The fastening material 90 brackets the darts 50 and 52. The center fastening element and either one of the outer fastening elements, and the included portion of the top element may be used with a patch 80 for covering either eye of the animal. The fastening material 90 on the inside of the mask 40 is preferably of the "Velcro" loop type. The loop type is a cushion type, without any abrasive edges, such as the hooks of the fastening elements 84 of the patch. Accordingly, when the patch or cup 80 is not in place within the mask, the material 90 causes no irritation to the animal's head.

The cup or patch 80 is preferably made of at least two layers of cotton brushed denim, and is accordingly washable and absorbent. Since it is virtually impossible to fasten a bandage directly onto a horse's eye, the cotton brushed denim patch actually acts as a bandage for the animal's eye. The cotton is absorbent, and accordingly absorbs drainage from the eye. At the same time, the patch is substantially opaque and blocks light to the eye. The patch or cup 80 is easily removed and replaced. By having two patches per mask, one patch is used while the other is being cleaned.

In order to cover a substantial area of the mask to prevent light from impinging on the animal's eye, the patch or cup 80 is preferably about eight or nine inches on a side.

When the animal's eye is healed, the patch or cup 80 may be removed, and the mask 40 may then be used as originally intended, namely as a shield against flies and other insects. At the same time, for a period of time while the healed eye is getting used to light again, the use of the mask apparatus 40 dereases the light impinging on the eye and thus allows the eye time to adjust to light conditions again.

The plush material 48 secured to the lower curved edge 46, the plush material 62 secured about the ear and forelock opening 60, and the plus material 64 secured to the upper edge 44, may be any appropriate type of material which is generically referred to as "plush" in its broadest sense. Thus, the "plush" may be natural fleece type material, or it may be artificial "fleece" material made of different types of threads, etc. Bits and pieces of material sewn together may also be used for the plush material. In the above discussion, the purpose of the plush material has been set out in detail, and it is obvious that a wide range of materials may be used to satisfy the broad definition of "plush" in terms of the structure and function of the material.

What I claim is:

1. Protective mask apparatus for the head and eyes of an animal comprising, in combination:
   panel means, including
      an upper edge adapted to be disposed about the head of the animal adjacent to the animal's neck and jaw,
      a lower edge adapted to be disposed about the nose of the animal remote from the neck,
      a first end extending between the upper and the lower edges and defining one side of the panel means, and
      a second end extending between the upper and the lower edges and defining another side of the panel means;
   an opening extending thorugh the panel means adjacent to the upper edge and adapted to receive the ears and forelock of the animal; and plush means secured to the lower edge and to the opening for providing a cushion for the panel means and the animal and for preventing insects from crawling beneath the panel means.

2. The apparatus of claim 1 in which the panel means is made of an elastomeric material.

3. The apparatus of claim 2 in which the elastomeric material comprises polyester threads coated with vinyl.

4. The apparatus of claim 3 in which the vinyl coated polyester threads are woven and fused to define a unitary mesh.

5. The apparatus of claim 2 in which the panel means comprises a mesh having openings covering not more than about forty percent of the area of the panel means.

6. The apparatus of claim 1 in which the panel means further includes fastening means secured to the first and second ends for fastening the panel means to the animal's head.

7. The apparatus of claim 6 in which the panel means further includes pocket means over the animal's eyes.

8. The apparatus of claim 7 which further includes cup means secured to the panel means for preventing light impinging on an eye of the animal.

9. The apparatus of claim 8 in which the cup means comprises a cup element secured about the pocket means to the panel means.

10. The apparatus of claim 9 in which the cup element is substantially opaque to prevent light from penetrating the panel means.

11. The apparatus of claim 8 in which the cup means is removably secured to the panel means.

12. The apparatus of claim 11 in which the pocket means includes a first pocket and a second pocket, and the cup means is selectively securable to the first pocket or to the second pocket.

13. The apparatus of claim 1 in which the panel means further includes plush material secured to the upper edge to provide a cushion for the panel means and the animal.

14. The apparatus of claim 13 in which the panel means further includes pocket means covering the animal's eyes.

15. The appartatus of claim 14 in which the panel means further includes patch means in the pocket means for preventing light from impinging on an eye of the animal.

* * * * *